Figure 1:
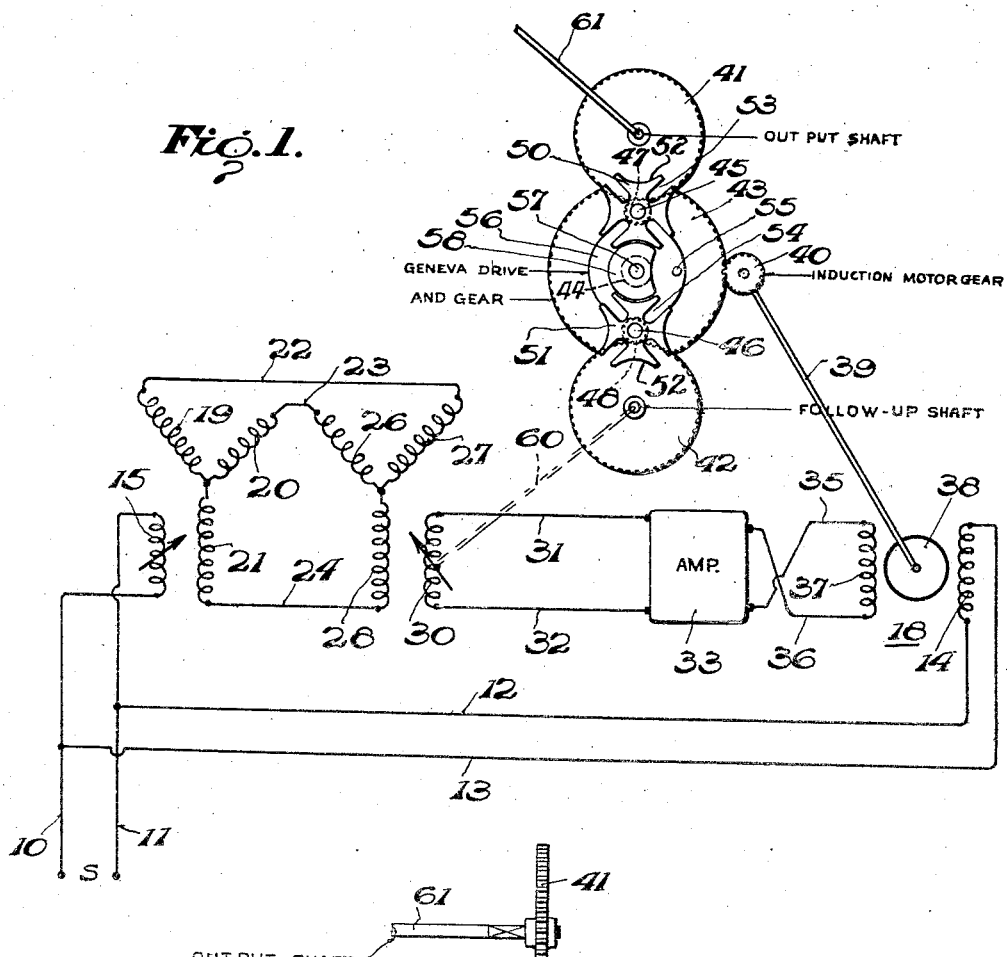

Oct. 15, 1946.    G. S. MILES    2,409,300
STEP-BY-STEP FOLLOW-UP AND ANTIHUNT MECHANISM
Filed Dec. 31, 1943

INVENTOR.
George S. Miles.
BY Herbert M. Birch
ATTORNEY

Patented Oct. 15, 1946

2,409,300

UNITED STATES PATENT OFFICE 2,409,300

STEP-BY-STEP FOLLOW-UP AND ANTIHUNT MECHANISM

George S. Miles, Maywood, N. J., assignor to Bendix Aviation Corporation, Teterboro, N. J., a corporation of Delaware Application December 31, 1943, Serial No. 516,436

12 Claims. (Cl. 172—239)

The present invention relates to follow-up connections and particularly to anti-hunting follow-up connections for restoring balance between electrically coupled remote control systems.

In electrical remote control systems comprising a synchronous induction transmitter electrically connected to a like synchronous repeater, wherein a resultant voltage set up in the transmitter stator windings causes a voltage unbalance between the stator windings and the rotor winding of the receiver to drive a polyphase or servo motor and a take-off shaft to an object at a remote point to be controlled, there is also a follow-up shaft connection driven from the motor. The follow-up shaft is associated with the receiver rotor so as to impart angular motion to the rotor simultaneously with the take-off shaft from the motor connected to the object being controlled, whereby balance is restored to the entire system when the receiver motor arrives at the same angular position as the transmitter rotor and the motor becomes deenergized.

Receiver rotors of such systems, though satisfactory to control some objects, are not satisfactory to control teletype numbering machines and other apparatus requiring positioning at discrete points. This unsatisfactory condition is present in these systems due to a tendency of such synchronous receiver rotors to hunt or overrun their synchronous position with respect to the transmitter rotors due to the flywheel effect of the follow-up motor and associated mechanism. Obviously, such hunting to either side of a null or synchronous point renders such system useless for practical use to remotely control calculators, teletype machines and the like.

Accordingly, an object of the present invention is to provide novel means for alternately moving the object control shaft with respect to the follow-up shaft associated with the receiver rotor, whereby a step-by-step rotation of each shaft is provided from the polyphase motor in lieu of a simultaneous rotation of both shafts as heretofore.

Another object is to provide a novel system for locking the object control shaft while the rotor follow-up shaft is being rotated and vice-versa, whereby said control shaft is always locked when the rotor crosses null or the synchronous point of balance for the said system, regardless of hunting from the flywheel action of the follow-up motor and associated connections.

Another object is to provide in a novel combination with a synchronous remote control system having an output control drive shaft and a follow-up shaft connected to the output of a polyphase motor for restoring balance in said system according to angular motion, an intermittent step-by-step drive connection between said control drive shaft and said follow-up shaft adapted to alternately lock and unlock first said control shaft and then said follow-up shaft, until the balance of said system is restored, whereby hunting is eliminated in said control shaft.

Another object is to provide in a system of the class described an anti-hunt drive coupling for discrete positioning of elements at remote points.

Still another object of the present invention is to provide the novel combination, in a system of the class described, of a double Geneva drive coupling, whereby hunting is entirely eliminated in the object control shaft.

Yet another object of the present invention is to provide a novel system for elimination of hunting of objects to either side of a point of synchronism for the system at remote control points, that is simple to manufacture, easily incorporated in standard systems of this class and of efficient and durable character.

The above and other objects and advantages of the present invention will appear more fully hereinafter from a consideration of the detailed description which follows, taken together with the accompanying drawing wherein one embodiment of the invention is illustrated. It is to be expressly understood, however, that the drawing is for the purpose of illustration only and is not designed as a definition of the limits of the invention. Reference for this latter purpose should be had to the appended claims.

In the drawing, wherein like reference characters refer to like parts in the specification and throughout the several views, Figure 1 is a schematic diagram of a remote control system circuit showing a front elevational view of the novel drive connection between the control motor, the object control shaft and the receiver rotor.

Figure 2:
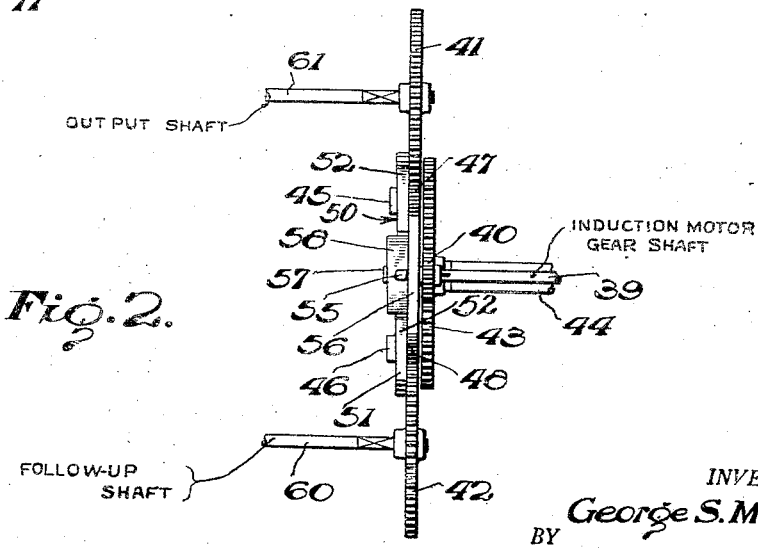

Figure 2 is a side elevational view of the novel drive connection.

Referring to the drawing and first with particular reference to Figure 1, S represents a suitable source of power connected by conductors 10 and 11 to a transmitter rotor 15, and by conductors 12 and 13 to the fixed phase winding 14 of a polyphase motor 18.

The system here shown is of the self-synchronous induction type including a transmitter comprising the rotor 15 adapted to induce signal voltage into stator windings 19, 20 and 21. Stator windings 19, 20 and 21 are connected by leads 22, 23 and 24 to receiver stator windings 26, 27 and 28, so as to induce the signal voltage in said receiver windings, which in turn induce signal voltage into receiver rotor winding 30.

Receiver winding 30 is tapped from each side by leads 31 and 32 to the input of an amplifier 33, of any suitable type, and the output of the amplifier is tapped by leads 35 and 36 to each side of the second phase winding 37 of motor 18.

Motor 18 has its rotor 38 novelly connected by shaft 39 to a step-by-step drive and follow-up connection by pinion gear 40. This drive and follow-up connection comprises a pair of gears 41 and 42, that are driven intermittently and alternately by what is commonly known as the Geneva movement, which in this particular illustration is a double Geneva movement.

Gears 41 and 42 lap over a driven gear 43 suitably mounted on a shaft 44, which may journal in a casing not shown. The gear 43 is driven by motor pinion 40, and all the gears referred to are arranged so their axes of rotation are aligned paraellel to each other. Mounted on stub shafts 45 and 46 extending from the face of gear 43 are pinions 47 and 48, so as to mesh with gears 41 and 42, and mounted on shafts 45 and 46 are star wheels 50 and 51 having a plurality of concaved edges or recesses 52 shown equi-distantly spaced and of equal lengths. Star wheels 50 and 51 may be integrally formed with their respective pinions if desired, and lap over their respective gears 41 and 42; the star wheels 50 and 51 having slots 53 and 54 respectively, intermediate or alternating with the concaved edges or recesses 52, that are adapted to receive a crank pin 55. The pin is carried by a disc 56 and is near its outer periphery. The disc 56 is secured to the center axis of gear 43 by stud 57, which also secures a sector member 58 having a short concaved recess or notch and a longer concentric circular or convexly arcuate portion adapted to mesh with the concave edges 52 of star wheels 50 and 51. The sector 58 prevents one star wheel from turning until pin 55 again engages with one of its slots after having moved into the slot of the other star wheel, whereby an intermittent alternate drive is imparted through pinions 47 and 48 to their respectively connected gears 41 and 42.

Gear 42 is connected by shaft 60 to receiver rotor 30 and gear 41 is connected by shaft 61 to any suitble object, not shown, to be controlled.

*Operation*

Assuming that a signal from transmitter rotor 15 and stator windings 19, 20 and 21 has been introduced into receiver stator windings 26, 27 and 28 and then induced into receiver rotor 30 and through amplifier 33 to the second phase 37 of motor 18, so that the same is energized; motor rotor 38 then drives the gear 43 through shaft 39 and pinion 40 in a direction according to the phase of said signal voltage. Such rotation of gear 43 carries with it disc 56, pin 55 and sector 58. Pin 55 and sector 58 now cooperate to alternately rotate first one star wheel and then the other through pinions 47 and 48 in mesh with gears 41 and 42, respectively.

Obviously, when pin 55 engages a slot 53 of star wheel 50, pinion 47, gear 41 and the shaft 61 are rotated, but sector 58 having its circular or convexly arcuate concentric non-mutilated portion in engagement with a concaved edge or recess 52 of opposed star wheel 51 locks the same against rotation. However, as rotation continues, pin 55 now engages with a slot 54 of the formerly locked star wheel 51, and rotates it and pinion 48, and through pinion 48 to drive gear 42 and shaft 60 connected to the receiver rotor 30 to turn or angularly displace the latter for the desired degree of adjustment, while the circular or convexly arcuate concentric non-mutilated portion of sector 58 enters a concaved edge or recess 52 of star wheel 50 and locks the star wheel 50 against rotation. If at this moment, the receiver rotor 30 is rotated to an angular position in synchronism with the transmitter rotor 15, the motor 18 becomes deenergized, and the object is positioned at the desired point, and cannot overrun or hunt to either side of synchronous position, because it is locked by the sector 58.

There is thus provided in a system of remote control a novel follow-up drive connection that is inherently non-hunting, wherein the most precise adjustments of the remotely controlled object or part may be made, so as to provide utility in apparatus not previously practical for such precise remote adjustments.

While only one embodiment of the invention has been illustrated and described, other changes and modifications, which will now appear to those skilled in the art, may be made without departing from the scope of the present invention. Reference is, therefore, to be had to the appended claims for a definition of the limits of the present invention.

What is claimed is:

1. In a self-synchronous remote control system including a servo motor driven thereby, a follow-up connection comprising a pair of alternately actuated gears, an intermediate constantly driven gear in mesh with each of said alternately actuated gears, means carried by one of said gears adapted to provide for said alternate actuation, and a pair of take off shafts from each of said alternately actuated gears, one of said shafts being connected to the rotor of a self-synchronous receiver in said control system and the other of said shafts being connected to an object to be controlled by the system, whereby said shaft connected to the object to be controlled is locked when said motor is deenergized to prevent oscillations of the said shaft and the object connected thereto from the newly attained position.

2. A follow-up connection for remote control systems comprising a polyphase servo motor, a gear train interposed in said follow-up connection, a self-synchronous induction device having a stator and a rotor adapted to control said motor, a pair of take off connections from said gear train, one of said take off connections being adapted to actuate any suitable object to be controlled and the other being adapted to actuate said rotor of said synchronous induction device, and means associated with said gear train adapted to alternately lock first said rotor while said object take off connection is being actuated and secondly to lock said object take off connection after said object has been positioned, while actuating said rotor take off connection to thereby return said rotor to a zero voltage position in synchronism with the angular position of said object take off connection and deenergize said motor.

3. A follow-up connection for remote control systems comprising a polyphase servo motor and a self-synchronous induction device having a stator and a rotor, a step by step drive having alternate sides thereof alternately driven by said motor, a take off connection from said step by step drive to the rotor of said self-synchronous induction device, and an output connection from an alternate side of said step by step drive to an object to be controlled, whereby energization of said motor by a change in the resultant voltage output of said synchronous induction device actuates said step by step drive so as to actuate said object to be controlled from said alternate side of said step by step drive to a position in synchronism with the said resultant voltage introduced into said self-synchronous drive, while maintaining the opposite alternate side of step by step drive locked, and whereby upon further actuation of said step by step drive said first alternate side of said step by step drive becomes locked, and said second alternate side is actuated to position the rotor of said self-synchronous device to a zero voltage position in synchronism with the position of the object controlled, so as to deenergize the motor.

4. A remote control system for angularly positioning an object at a remote point, comprising in combination, self-synchronous induction means having a transmitter and a repeater, an amplifier and a servo motor, said transmitter having a wound rotor and said repeater having a wound rotor, said repeater rotor output being connected to the input of said amplifier, said amplifier output being connected to a winding of said servo motor; a non-hunting follow-up connection driven by said motor interconnecting said servo motor with said repeater rotor and said remotely positioned object, said connection comprising a synchronous step by step alternate drive for said repeater rotor and said object to be controlled, whereby said object is locked in angular agreement with said repeater rotor when said system is in synchronism.

5. A remote control system for angularly positioning an object at a remote point, comprising in combination, self-synchronous induction means having a transmitter and a repeater, an amplifier and a servo motor, said transmitter having a wound rotor and said repeater having a wound rotor, said repeater rotor output being connected to the input of said amplifier, said amplifier output being connected to a winding of said servo motor; a non-hunting follow-up connection driven by said motor interconnecting said servo motor with said repeater rotor and said remotely positioned object, said connection comprising take off means from said motor, a double Geneva drive connection driven by said take off means, take off means from opposite sides of said Geneva drive connection, one of said second named take off means being connected to an object to be angularly positioned and the other of said means being connected to said repeater rotor, whereby when said system is out of synchronism said rotor is angularly positioned, while said object is locked, and said rotor is locked, while said object is angularly positioned.

6. In a remote control system of the class described, comprising a transmitter having a wound rotor and a stator, a receiver having a wound rotor and a stator, a servo motor; a follow up means interconnected between said receiver rotor and said motor, said means comprising rotatable means connected to said motor, second rotatable means adjacent said first rotatable means connected to said receiver rotor, third rotatable means adjacent said first rotatable means connected to a remote control point, and means carried by said first mentioned rotatable means adapted to alternately drive first said second rotatable means and then said third rotatable means to thereby alternately position first said receiver rotor and then said means connected to said remote control point.

7. The combination with motor driving means, of a non-hunting follow-up mechanism comprising a double Geneva follow-up connection comprising a central member, a motor driven by said driving means and operatively connected to the central member, a pair of oppositely disposed members overlapping and geared to said central member, means intermediate said oppositely disposed members in driving connection therewith, said intermediate means including a member having means adapted to intermittently drive said pair of oppositely disposed members and having means adapted to first lock one of said oppositely disposed members while the other is driven, and then lock the latter oppositely disposed member while the first oppositely disposed member is driven.

8. The combination with a displaceable power means responsive to position and a motor driven thereby, of a step-by-step follow-up and anti-hunt mechanism comprising a double Geneva follow-up connection including a central member driven by said driven motor, a pair of oppositely disposed driven members overlapping and geared to said central member, a take-off from one of said driven members to the power means, means intermediate said oppositely disposed members in driving connection therewith, said intermediate means including a central locking and driving member adapted to alternately drive said oppositely disposed members and having means cooperating therewith to first lock one of said oppositely disposed members while the other is driving and then lock the other opposite member while the other member is driving, and a take-off from the other of said driven members to a member to be adjusted or controlled.

9. The combination with a source of power, of a step-by-step follow-up and anti-hunt mechanism comprising a double Geneva follow-up connection comprising a central member driven by said source of power, a pair of oppositely disposed driven members overlapping and geared to said central member, means intermediate said oppositely disposed members in driving connection therewith, said intermediate means including a central locking and driving member adapted to alternately drive said oppositely disposed members and having means cooperating therewith to first lock one of said oppositely disposed members while the other is driving and then lock the other opposite member while the other member is driving, take-off means on one of said members operatively connected to the source of power and a take-off means on the other member for driving an object to be controlled at a remote point.

10. A step-by-step follow-up and anti-hunt mechanism for self-synchronous remote control systems including a self-synchronous induction transmitter having a stator and a rotor inductively coupled thereto, and a self-synchronous induction receiver having a stator in circuit with the transmitter stator and a rotor inductively coupled thereto and responsive to the movements of the transmitter rotor, a source of power connected to the transmitter rotor, a servo motor inductively driven from the receiver rotor through an amplifying means and said source of power, a plurality of spaced similarly driven members, a constantly driven member operatively geared to the motor and disposed intermediate said spaced driven members, means cooperating between said spaced driven members and said constantly driven member for causing alternate intermittent actuation of said spaced driven members, a take-off shaft from each of said alternately driven spaced members, one of said shafts being connected to the rotor of the receiver and other of the shafts being adapted to be connected to an object to be controlled, and locking means associated with said actuating means and said alternately driven members whereby certain of said alternately driven members and said other of the take-off shafts connected to the object to be controlled are locked when another of said alternately driven members is driven and said motor is deenergized by establishing synchronism between the rotors to prevent oscillations of said shafts, rotors or motor and an object connected to other of the shafts from the positions to which it is moved and whereby other of said alternately driven members and take-off shaft therefrom, including the shaft connected to the receiver rotor are locked when the motor is deenergized and another of said members is driven.

11. A follow-up connection for remote control systems comprising a servo motor, driving connections interposed in said follow-up connection, a self-synchronous induction device having a transmitter stator and rotor connected to a suitable source of current and a receiver stator and rotor responsive thereto and adapted to drive the motor in connection with said current, take-off connections from opposite ends of said interposed driving connections, one of said take-off connections being adapted to actuate a remote object to be controlled and another being adapted to actuate said receiver rotor, and means associated with said drive connections adapted to alternately hold said receiver rotor against movement after the same has been positioned in synchronism with the transmitter rotor and while said object take-off connection is being actuated, and secondly, to hold said object take-off connection against movement after said object has been positioned while actuating said take-off connection to the receiver rotor, to thereby move said receiver rotor to a position in synchronism with its transmitter rotor and the angular position of the object and take-off connection thereof to deenergize said motor, whereby the object is positioned at the desired point and prevented from overrunning or hunting to either side of the synchronized position.

12. A follow-up connection for remote control systems comprising a servo motor and a self-synchronous induction device having a stator and a rotor, a step-by-step drive having a plurality of take-off connections alternately driven by said motor to the rotor of said induction device and to an object to be controlled whereby energization of said motor by said induction device actuates said step-by-step drive to actuate said object from one side of said drive while maintaining another take-off connection locked at another side of said drive, and whereby upon further actuation of said step-by-step drive, the other take-off connection is locked and the aforesaid other take-off connection is actuated to position the rotor to a position in synchronism with the object controlled to deenergize the motor and prevent overrunning or hunting thereof.

GEORGE S. MILES.